US008530091B2

(12) United States Patent
Bernard et al.

(10) Patent No.: US 8,530,091 B2
(45) Date of Patent: Sep. 10, 2013

(54) LITHIATED OXIDE FOR A POSITIVE ELECTRODE OF AN ALKALINE ACCUMULATOR

(75) Inventors: Patrick Bernard, Bordeaux (FR); Lionel Goubault, Carignan de Bordeaux (FR); Rémi Najean, Sers (FR)

(73) Assignee: SAFT, Bagnolet (FR)

( * ) Notice: Subject to any disclaimer, the term of this patent is extended or adjusted under 35 U.S.C. 154(b) by 260 days.

(21) Appl. No.: 13/061,066

(22) PCT Filed: Aug. 25, 2009

(86) PCT No.: PCT/IB2009/006626
§ 371 (c)(1),
(2), (4) Date: Feb. 25, 2011

(87) PCT Pub. No.: WO2010/023531
PCT Pub. Date: Mar. 4, 2010

(65) Prior Publication Data
US 2011/0151329 A1    Jun. 23, 2011

(30) Foreign Application Priority Data

Aug. 29, 2008 (FR) .................................... 08 04757

(51) Int. Cl.
*H01M 10/30* (2006.01)
(52) U.S. Cl.
USPC ........................................................ 429/223
(58) Field of Classification Search
None
See application file for complete search history.

(56) References Cited

U.S. PATENT DOCUMENTS

| 6,017,655 | A | 1/2000 | Ovshinsky et al. | |
| 6,114,063 | A * | 9/2000 | Katsumoto et al. | 429/223 |
| 6,274,270 | B1 * | 8/2001 | Audry et al. | 429/223 |
| 6,348,284 | B1 | 2/2002 | Bernard et al. | |
| 2004/0091778 | A1 | 5/2004 | Ozaki et al. | |
| 2004/0175618 | A1 | 9/2004 | Inoue et al. | |

FOREIGN PATENT DOCUMENTS

| EP | 0 866 510 | A2 | 9/1998 |
| EP | 1 022 793 | A1 | 7/2000 |
| EP | 1 111 701 | A1 | 6/2001 |
| EP | 1 927 581 | A2 | 6/2008 |
| JP | 9-259878 | A | 10/1997 |
| JP | 10-001316 | A | 1/1998 |
| JP | 11-238507 | A | 8/1999 |
| JP | 11-260359 | A | 9/1999 |
| JP | 2005-123180 | A | 5/2005 |
| JP | 2008-103308 | A | 5/2008 |

OTHER PUBLICATIONS

P. Kalyani et al.: "A new solution combustion route to synthesize LiCoO2 and LiMn2O4", Journal of Power Sources, vol. 111, No. 2, Sep. 23, 2002, pp. 232-238. XP004381131. ISSN: 0378-7753, para. [03.4], fig. 5a; table 1.
Y.K. Sun et al.: "Synthesis of ultrafine LioO2 powders by the sol-gel method" Journal of the Materials Science, vol. 31, No. 14, Jul. 15, 1996, pp. 2617-3621, XP000599896, ISSN: 0022-2461.
I.H. Oh et al.: "Low-temperature preparation of ultrafine LiCoO2 powders by the sol-gel method", Journal of Materials Science, vol. 32, No. 12, Jun. 15, 1997, pp. 3177-3182. XP000704259; ISSN: 0022-2461.
S.M. Lala et al.: "LiCoO2 sub-microns particles obtained from micro-precipitation in molten stearic acid", Journal of Power Sources, vol. 124, No. 1, Oct. 1, 2003, pp. 118-123. XP004454601, ISSN: 0378-7753.
C. Tessier et al.: "A conductive additive for positive electrodes of alkaline batteries", Journal of the Electrochemical Society, vol. 152, No. 6, May 12, 2005, pp. A1248-A1264, XP002569104, ISSN: 0013-4651.
International Search Report dated Mar. 23, 2010 for International Application No. PCT/IB2009/006626.

* cited by examiner

*Primary Examiner* — Patrick Ryan
*Assistant Examiner* — Wyatt McConnell
(74) *Attorney, Agent, or Firm* — Sughrue Mion, PLLC

(57) ABSTRACT

A positive electrode of an accumulator with an alkaline electrolyte comprising a nickel-based hydroxide and a lithiated oxide of formula $Li_xMO_2$ wherein
M represents at least one transition metal,
$0.1 \leq x \leq 1$,
said lithiated oxide having a specific surface area as measured by the BET technique of less than 40 m$^2$/g and a grain size of less than 1 μm.
A method for making a lithiated oxide of at least one transition metal comprising the steps of:
a) providing a powder of an hydroxide of said at least one transition metal,
b) suspending the powder in a lithine solution in the presence of a stream of a oxidizing gas in order to form a lithiated oxide of said at least one transition metal, the lithine concentration being at least equal to about 1 mol/L,
c) adding to the suspension of step b) a solution containing an oxidizing compound,
d) filtering the suspension,
e) washing and drying the suspension.

10 Claims, No Drawings

LITHIATED OXIDE FOR A POSITIVE ELECTRODE OF AN ALKALINE ACCUMULATOR

TECHNICAL FIELD

The invention relates to the technical field of secondary electrochemical generators (accumulators) with an alkaline electrolyte, in particular to nickel-cadmium (NiCd) or nickel-metal hydride (NiMH) accumulators.

STATE OF THE ART

Non-sintered nickel electrodes used as a positive electrode in accumulators with an alkaline electrolyte provide a higher energy density than sintered nickel electrodes. They are also simpler to make.

A non-sintered nickel electrode typically comprises a support used as a current collector on which is coated a paste containing an electrochemically active material, further called an active material, a binder and most often a conducting material. Once the paste is deposited on or in the support, the whole is compressed and dried in order to obtain an electrode with the desired density and thickness.

The current collector support of a non-sintered electrode may be three-dimensional. A typical three-dimensional support for example consists in nickel foam. The collector support may also be two-dimensional. As a two-dimensional support, mention may be made of a metal plate, a perforated metal sheet or a deployed metal sheet.

The active material of the nickel electrode consists of a hydroxide based on nickel. Nickel hydroxide is a not very conducting compound which requires adding a material providing proper electrical percolation into the electrode. The paste therefore generally contains a conducting material which may for example be a cobalt compound such as metal cobalt Co, cobalt hydroxide $Co(OH)_2$ or cobalt oxide CoO.

During the first charging of the alkaline accumulator, the cobalt compounds are oxidized into cobalt oxyhydroxide CoOOH in which cobalt is brought to an oxidation degree greater than or equal to 3. This cobalt oxyhydroxide is stable in the normal operating range of the positive nickel electrode and insoluble in the alkaline electrolyte. However, for extended storage, i.e. for a duration exceeding a few months, the voltage of the alkaline accumulator tends towards 0 V. Under these conditions, cobalt oxyhydroxide is no longer stable and is slowly reduced. Cobalt is brought to the oxidation degree of +2.66 in $Co_3O_4$, and it then reaches an oxidation degree of +2 in $Co(OH)_2$. Now, cobalt hydroxide $Co(OH)_2$ is a compound which is very soluble in the alkaline electrolyte. Therefore, a capacity loss of the alkaline accumulator is observed due to partial dissolution of the percolating network of the non-sintered electrode. The result of this is an irreversible capacity loss of the accumulator which may exceed 15%. This irreversible loss occurs regardless of the cobalt compound which is presently introduced into the paste.

In European Patent Application EP-A-0866510, the use of a highly lithiated conducting cobalt compound of the $Li_xCoO_2$ type with x comprised between 0.2 and 0.9 is proposed. The synthesis method is broken down into two steps. In a first step, a cobalt hydroxide $Co(OH)_2$ powder is oxidized in air at 120° C. for 48 hours in order to form a compound of the cobalt oxyhydroxide type. Next, the cobalt oxyhydroxide is suspended at 80° C. for 90 hours in a 50 g/L lithium hydroxide solution in a mass proportion of 10 for 1 with respect to cobalt. It is stated that the use of the compound $Li_xCoO_2$ allows an improvement in the recharging of the accumulator after the latter has been stored for 14 days at 65° C. in a deeply discharged condition. No lifetime indication is described in this patent.

In the publication, *Journal of the Electrochemical Society*, 152(6) A1284-A1264, it is stated that a compound of the $Li_xCoO_2$ type is a good electron conductor and that it may be used as an additive in the positive electrode of an alkaline accumulator in order to reduce the capacity loss of the accumulator when its voltage decreases. The cycling tests results for the accumulator are limited to 14 cycles. The compound of type $Li_xCoO_2$ is synthesized according to the following method: a cobalt hydroxide powder is suspended in a solution of lithine (lithium hydroxide) at a temperature comprised between 70 and 95° C., for a duration comprised between 3 hrs and 48 hrs.

In Patent Application EP-A-1 022 793, the use of a lithiated nickel and cobalt oxide $Li_xNi_yCo_{1-y}O_2$ with x comprised between 0.1 and 1 and y comprised between 0.02 and 0.9 is proposed, and the stability of which is very highly improved with respect to the prior compounds. The use of such a compound in the electrode solves the technical problem related to storage capacity losses. However, adding such a compound into the positive electrode considerably reduces the lifetime of the accumulator. In this document, the $Li_xNi_yCo_{1-y}O_2$ compound is made according to the following method: a mixed nickel and cobalt hydroxide powder is oxidized into a mixed nickel and cobalt oxyhydroxide by a solution of NaOCl for two hrs at 20° C. The mixed nickel and cobalt oxyhydroxide is then suspended in a solution of lithine LiOH at 90° C. for 72 hrs.

An alkaline accumulator is therefore sought which has an improved lifetime during cycling and a low storage capacity loss.

In the documents mentioned above, the duration for synthesizing the conducting additive is greater than or equal to 3 hours. A fast method for synthesizing a lithiated oxide of a transition metal is therefore also sought, i.e. with a duration of less than 3 hrs.

SUMMARY OF THE INVENTION

The object of the invention is a lithiated oxide of formula $Li_xMO_2$ wherein M represents at least one transition metal with $0.1 \leq x \leq 1$, said lithiated oxide having a specific surface area (further called a developed area) measured by the BET technique of less than 40 m$^2$/g and a grain size of less than 1 µm.

Said lithiated oxide is advantageously used in the nickel electrode (positive electrode) of an accumulator with an alkaline electrolyte. The thereby obtained accumulator with an alkaline electrolyte has improved storage and cycling lifetimes.

According to an embodiment, the lithiated oxide has the formula $Li_xNi_yCo_{1-y}O_2$, wherein $0.1 \leq x \leq 1$ and $0 \leq y \leq 0.9$.

According to an embodiment, x is greater than or equal to 0.5, preferably greater than or equal to 0.8.

According to an embodiment, y is less than 0.2, preferably less than 0.1, still preferably less than 0.05.

According to an embodiment, the specific surface is less than or equal to 30 m$^2$/g, preferably less than or equal to 20 m$^2$/g, preferably less than or equal to 15 m$^2$/g, preferably less than or equal to 10 m$^2$/g.

According to an embodiment, the BET surface area is greater than m$^2$/g.

According to an embodiment, the grain size is less than 0.9 µm.

The object of the invention is also an electrode comprising a mixture of a powder of a lithiated oxide as described earlier, with a powder of a nickel-based hydroxide.

The object of the invention is also an electrode comprising a powder of a nickel hydroxide, in which the nickel hydroxide grains are covered with the lithiated oxide described earlier.

The object of the invention is also an accumulator comprising an electrode as described earlier.

The object of the invention is also a method specially designed for making a lithiated oxide of at least one transition metal as described earlier.

This method comprises the steps of:
a) providing a powder of an hydroxide of said at least one transition metal,
b) suspending the powder in a lithine solution (LiOH) in the presence of a stream of a oxidizing gas in order to form a lithiated oxide of said at least one transition metal, the lithine concentration being at least equal to about one mol/L,
c) adding to the suspension of step b) a solution containing an oxidizing compound,
d) filtering the suspension,
e) washing and drying the suspension.

With the method according to the invention, it is possible to prepare a lithiated oxide of at least one transition metal having a specific surface area as measured by BET, of less than 40 $m^2/g$ and a grain size of less than 1 µm.

According to an embodiment, the sum of the durations of steps b) and c) is less than 3 hours, preferably less than or equal to 1 hour 30 minutes.

According to an embodiment, the temperature of the lithine solution in step b) is comprised between 70 and 105° C., preferably between 70 and 95° C.

According to an embodiment, the molar ratio of lithine over the hydroxide of said at least one transition metal is greater than or equal to 1, preferably from 1 to 3.

According to an embodiment, the molar ratio of the oxidizing compound of step c) over the lithiated oxide of said at least one transition metal is comprised between 5% and 100%, preferably between 15 and 50%.

DETAILED DISCUSSION OF THE EMBODIMENTS

The object of the present invention is a conducting material for a positive electrode of an accumulator with an alkaline electrolyte. This conducting material is a lithiated oxide of at least one transition metal, the specific surface area of which is less than 40 $m^2/g$, preferably, less than or equal to 30 $m^2/g$, still preferably less than or equal to 20 $m^2/g$.

The lithiated oxide of at least one transition metal is used as a powder, the grain size of which, i.e. the average diameter of the particles (or grains) forming the powder, is less than 1 µm. Preferably, a powder of the lithiated oxide is used, the grain size of which is less than 0.9 µm. Still preferably the grain size is less than or equal to 0.7 µm.

Said at least one transition metal is preferably selected from the group comprising nickel, cobalt, manganese, aluminum, iron and copper or a mixture thereof.

According to a preferred embodiment, said lithiated oxide of at least one transition metal is a lithiated nickel and cobalt oxide of formula $Li_xNi_yCo_{1-y}O_2$, wherein $0.1 \leq x \leq 1$ and $0 \leq y \leq 0.9$. Preferably $0.02 \leq y \leq 0.9$.

According to an embodiment, x is greater than or equal to 0.50.

According to an embodiment, x is greater than or equal to 0.80.

According to an embodiment, y is less than 0.2, preferably less than 0.1, still preferably less than 0.05.

The lithiated oxide of at least one transition metal according to the invention is used as a conducting compound in at least one non-sintered nickel electrode of an alkaline accumulator. Said lithiated oxide is characterized by good stability under prolonged storage conditions, i.e. a storage for a duration of several months, regardless of the potential conditions.

The use of a lithiated oxide of at least one transition metal, having a small grain size, of less than 1 µm, and, the specific surface area of which is less than 40 $m^2/g$, gives the possibility of obtaining both good performances of the accumulator during deep cycling, i.e. with a discharge depth of at least 95% of its capacity, as well as satisfactory capacity after prolonged storage at a low potential. By using this lithiated oxide, it is possible to obtain an excellent lifetime of the accumulator.

The lithiated oxides of at least one transition metal of the prior art have a strong specific surface area, i.e. greater than or equal to 40 $m^2/g$. A compound of the $Li_xCoO_2$ type with x ranging from 0.2 to 0.9, as described in EP-A-0 866 510 was reproduced by the Applicant by using the operating conditions described in this document. The obtained compound has strong specific area: 72 $m^2/g$ and a grain size of less than or equal to 1 µm.

Also, the compound of formula $Li_xCoO_2$, described in the publication, *Journal of The Electrochemical Society*, 152(6) A1284-A1264, was reproduced by the Applicant by using the operating conditions described in this document. The obtained compound has a specific surface area of the order of 50 $m^2/g$ and a grain size ranging from 0.1 to 0.2 µm.

Also, a compound of formula $Li_xNi_yCo_{1-y}O_2$ wherein x is comprised between 0.1 and 1 and y is comprised between 0.2 and 0.9, as described in EP-A-1 022 793 was reproduced by the Applicant by using the operating conditions described in this document. The compound obtained under these synthesis conditions has a specific surface area of 63 $m^2/g$ and a grain size of less than 0.7 µm.

None of the oxides prepared according to the methods described in the three references have both low specific surface area, i.e. less than 40 $m^2/g$ and small grain size, i.e. less than 1 µm. All have a grain size of less than or equal to 1 µm but none have a specific surface area of less than 40 $m^2/g$. Without intending to be bound by theory, the applicant believes that because of their high specific surface area, such compounds, added within the positive electrode, absorb a substantial amount of electrolytes to the expense of the separator and of the negative electrode. The drying of the separator and of the negative electrode which results from this, leads to a reduction in the lifetime of the alkaline accumulator.

The invention also relates to an original and fast method for making a lithiated oxide compound of at least one transition metal. With this method, it is possible to make a powder of a lithiated oxide of at least one transition metal having small grain size, of less than 1 µm, low specific surface area, i.e. less than 40 $m^2/g$ and a good electron conductivity, preferably greater than or equal to 0.1 S/cm. Another advantage of this method lies in the fact that the synthesis of the oxide is carried out at low temperature within a short time of less than 3 hours.

The method for making the lithiated oxide of at least one transition metal comprises the following steps:
a) A powder of an hydroxide of at least one transition metal, preferably a mixed nickel and cobalt hydroxide, is provided,
b) This powder is suspended with mechanical stirring in an heated alkaline solution comprising lithine at a concentration of at least equal to about 1 mol/L. The suspension is accomplished in the presence of a stream of oxidizing gas (bubbling). Preferably, the oxidizing gas is selected from oxygen, ozone or air, preferably oxygen.

c) The bubbling is stopped. An oxidizing solution is added to the reaction medium. Preferably, the oxidizing solution is selected from the group comprising sodium hypochlorite, calcium hypochlorite and hydrogen peroxide (oxygenated water). Preferably, sodium hypochlorite is used.

d) The powder of the lithiated oxide of said at least one transition metal is filtered.

e) The powder of the lithiated oxide of said at least one transition metal is washed and dried.

The synthesis duration, i.e. the sum of the durations of steps b) and c), is less than 3 hours.

The concentration of lithine solution is greater than or equal to 1 mol/L, preferably from 1 to 5 mol/L, still preferably from 2 to 5 mol/L. The molar ratio of lithine over the hydroxide of said at least one transition metal is greater than 1, preferably between 1 and 3.

The temperature of the lithine solution is preferably comprised between 70 and 105° C., still preferably between 70 and 95° C.

The molar ratio of the oxidant over the lithiated hydroxide of said at least one transition metal is generally comprised between 5% and 100%, preferably between 15% and 50%.

The bubbling time is generally comprised between 30 minutes and 150 minutes, preferably between 60 and 120 minutes.

The lithiated oxide of at least one transition metal obtained by the method according to the first embodiment may have the formula $Li_xNi_yCo_{1-y}O_2$, wherein $0.1 \leq x \leq 1$ and $0 \leq y \leq 0.9$. Preferably, $0.02 \leq y \leq 0.9$. It may optionally contain sodium in an amount of less than 5 atomic percent. Its conductivity is preferably $10^{-1}$ S·cm$^{-1}$.

Once it is washed and dried, the lithiated oxide of said at least one transition metal appears as a powder.

According to a first embodiment, the powder of the lithiated oxide of said at least one transition metal is mixed with an active material powder, in an amount typically comprised between 5 and 12% by weight relatively to the weight of the dry paste, preferably between 5 and 9%.

The electrochemically active material is nickel-based hydroxide. By hydroxide based on nickel is meant a nickel hydroxide, a hydroxide mainly containing nickel, but also a nickel hydroxide containing at least one syncrystallized hydroxide of an element selected from zinc (Zn), cadmium (Cd), magnesium (Mg), and aluminum (Al), and at least one syncrystallized hydroxide of an element selected from cobalt (Co), manganese (Mn), aluminum (Al), yttrium (Y), calcium (Ca), zirconium (Zr), copper (Cu). A syncrystallized hydroxide contained in the nickel hydroxide is a hydroxide forming a solid solution with nickel hydroxide, i.e. occupying in a continuously variable proportion, the atomic sites defined by the crystalline lattice of the nickel hydroxide.

A binder, a thickener and water are added to the mixture comprising the lithiated oxide powder and the active material powder in order to form a paste. This paste is then deposited on a conducting support. The whole is compressed and dried in order to obtain an electrode with the desired density and thickness. The thereby obtained electrode is used as a positive electrode of an accumulator with an alkaline electrolyte.

The binder comprises at least one compound selected from an optionally carboxylated styrene and butadiene copolymer (SBR), an acrylonitrile and butadiene copolymer (NBR), a copolymer of styrene, ethylene, butylene and styrene (SEBS), a terpolymer of styrene, butadiene and vinyl pyridine (SBVR), polyamide (PA), polyethylene (PE), a copolymer of the ethylene-vinyl acetate type (EVA), a polymer with an acrylate function of the polyacrylate type, a styrene-acrylate polymer, a styrene-maleic anhydride, a polytetrafluoroethylene (PTFE), a fluorinated copolymer of ethylene and propylene (FEP), polyhexafluoropropylene (PPHF), and perfluoromethylvinylether (PMVE).

The thickener may be selected from carboxymethylcellulose (CMC), hydroxyethylcellulose (HEC), hydroxypropylmethylcellulose (PMC), hydroxypropylcellulose (HPC), polyacrylic acid PAAc, xanthan gum.

The paste may further contain at least one compound selected from zinc compounds, such as ZnO or $Zn(OH)_2$, yttrium compounds such as $Y_2O_3$ or $Y(OH)_3$, ytterbium compounds such as $Yb_2O_3$ or $Yb(OH)_3$, niobium compounds such as $Nb_2O_5$, strontium compounds such as $SrSO_4$ and calcium compounds such as CaO, $Ca(OH)_2$. This compound is customarily added in a powdery form.

Conducting or non-conducting fibres may be added into the electrode. Preferably, the amount of added fibres is less than 1.5% of the weight of the dry paste. Preferably, these will be polymeric fibres of polypropylene for example with a diameter comprised between 10 and 35 μm and a length of less than 2 mm.

The current collector may be a two-dimensional conducting support such as a solid or perforated sheet, a deployed metal, a grid or a fabric, or a porous three-dimensional conducting support such as a felt or a foam. This support may be based on metal or carbon.

According to a second embodiment, the lithiated oxide of at least one transition metal forms a coating around active material grains. The specific surface area of said lithiated oxide, as measured by BET, is preferably less than or equal to 15 m$^2$/g, preferably further less than or equal to 10 m$^2$/g. The lithiated oxide is conducting and resists to low potential storage.

In the following, are discussed the steps of the method for making a nickel-based hydroxide, the surface of the grains of which is covered with lithiated oxide of at least one transition metal according to the invention.

The method comprises the following steps:

a) A nickel-based hydroxide powder is provided, the surface of which is covered with hydroxide of at least one transition metal, preferably a mixed nickel and cobalt hydroxide, b) This powder is suspended with mechanical stirring in a heated alkaline solution comprising lithine at a concentration of at least equal to about 1 mol/L. The suspension is achieved in the presence of a stream of oxidizing gas (bubbling). Preferably, the oxidizing gas is selected from oxygen, ozone or air, preferably oxygen.

c) The bubbling is stopped. An oxidizing solution is added to the reaction medium. Preferably, the oxidizing solution is oxygenated water.

d) The powder of the nickel-based hydroxide covered with said lithiated oxide of at least one transition metal is filtered.

e) The powder of the nickel-based hydroxide covered with said lithiated oxide of at least one transition method is washed and dried.

The concentration of the lithine solution is greater than or equal to 1 mol/L, preferably from 1 to 5 mol/L, preferably between 2 and 5 mol/L. The molar ratio of lithine over the hydroxide of at least one transition metal is from 1 to 7, preferably from 1 to 3, still preferably from 1 to 2.

The temperature of the lithine solution is preferably comprised between 70 and 105° C., still preferably between 70 and 95° C.

The molar ratio of the oxidizing over the lithiated hydroxide of said at least one transition metal is generally comprised between 5% and 100%, preferably between 15% and 50%.

In this second embodiment, the bubbling time is generally comprised between 30 minutes and 120 minutes, preferably between 30 and 70 minutes.

The synthesis duration, i.e. the sum of the durations of the steps b) and c), is less than 3 hours. This method is therefore fast.

Said lithiated oxide of at least one transition metal forming a coating around active material grains, is preferably a lithiated oxide of nickel and cobalt of formula $Li_xNi_yCo_{1-y}O_2$, wherein $0.1 \leq x \leq 1$ and $0 \leq y \leq 0.9$. Preferably $0.02 \leq y \leq 0.9$.

Once it is washed and dried, the nickel-based hydroxide covered with said lithiated oxide of at least one transition metal, as a powder, is mixed with a binder, a thickener and water in order to form a paste. This paste is deposited on a current collector conducting support. The whole is compressed and dried in order to obtain an electrode with the desired density and thickness. The thereby obtained electrode is used as a positive electrode of an accumulator with an alkaline electrolyte.

The binder, the thickener, the current collector may be selected like in the first embodiment of the method according to the invention.

In a third embodiment, a nickel-based hydroxide powder, the grains of which are coated with lithiated oxide of at least one transition metal, is mixed with a powder of a lithiated oxide of at least one transition metal.

The electrode according to the invention may be used in any accumulator with an alkaline electrolyte, such as for example accumulators containing nickel-hydridable metal, nickel-cadmium, nickel-iron, nickel-zinc, nickel-hydrogen pairs.

Other features and advantages of the present invention will become apparent upon reading the following examples:

EXAMPLES

In the following example the method for measuring the BET specific surface area is described.

The specific surface area of different powders is measured as follows. A powder sample is taken for which the mass is comprised between 0.1 and 1 g. For good measurement accuracy, a specific surface area has to be at least of about 1 m²/g. A 10 cm³ cell is used. The whole of the measuring cell is weighed. Next, the sample is added in the cell. The whole is weighed. The measuring cell is placed on a degassing station and the sample is degassed for 12 hours at 120° C. The cell is rapidly plugged with a stopper after degassing. The whole is weighed after returning to room temperature and the result is noted. All the weighing operations are carried out without the plug. The mass of the sample is obtained by subtracting the mass of the cell from the mass of the cell plus degassed sample.

The analysis of the sample is then conducted by means of a Belsorp Mini analyzer from Bel Japan Inc. The measurement is based on the adsorption of nitrogen by the sample at a given temperature, here liquid nitrogen temperature, i.e. −196° C. The apparatus measures the pressure of this reference cell in which the adsorbate is at its saturating vapor pressure and that of the cell of the sample into which known volumes of adsorbate are injected. The curve resulting from these measurements is the adsorption isotherm. In the measuring process, it is necessary to know the dead space of the cell: a measurement of this space is therefore conducted with helium before the analysis.

The mass of the sample calculated earlier is entered as a parameter. The BET surface area is determined by the software package by linear regression from the experimental curve. The reproducibility standard deviation obtained from 5 measurements on a powder of specific surface area 65 m²/g is 2.5. Twice a year, a check is carried out with a reference powder, here the alumina of reference Micrometrics 16822.

Example 1

Outside the Invention

A sealed nickel-hydridable metal Ni MH accumulator of format AA and the rated capacity C of which is 1200 mAh, is made in the following way.

The positive electrode is made with a paste having as a weight composition (expressed in percent with respect to the weight of the dry paste):

| | |
|---|---|
| electrochemically active material | 92.7% |
| conducting material | 6% |
| binder | 1% |
| thickener | 0.3% |

The powdery electrochemically active material consists of a hydroxide based on nickel. The conducting material is cobalt hydroxide powder. The binder is polytetrafluoroethylene (PTFE). The thickener is the sodium salt of carboxymethylcellulose (CMC). The viscosity of the paste is adjusted with water. The paste is introduced into the conducting support used as a current collector which is a nickel foam with a porosity of about 95%. Once the paste is introduced into the support, the whole is dried in order to remove water therefrom, and then laminated in order to obtain the electrode.

The negative electrode has, as an electrochemically active material, an intermetallic compound capable of forming a hydride once it is charged. Its capacity is greater than that of the positive electrode. Each positive electrode is placed beside a negative electrode from which it is insulated by a separator consisting of polypropylene non-woven fabric in order to form the electrochemical bundle. The spiral bundle is inserted into a metal cup and impregnated with an alkaline electrolyte which is an aqueous alkaline solution consisting of a mixture of 7.4 mol/L potassium hydroxide KOH, 0.5 mol/L lithium hydroxide LiOH and 0.4 mol/L sodium hydroxide NaOH.

An accumulator A, the positive electrode of which contains as a conducting material, cobalt hydroxide $Co(OH)_2$ is made in the way described earlier.

Example 2

Outside the Invention

An accumulator B is made as described in Example 1, but the positive electrode contains nickel hydroxide, the surface of which is covered with $Co(OH)_2$ instead of a mixture of nickel hydroxide and cobalt hydroxide powders. The weight composition of the dried paste contained in this electrode is the following:

| | |
|---|---|
| $Ni(OH)_2$ the surface of which is covered with $Co(OH)_2$: | 98.7% |
| Binder | 1% |
| Thickener | 0.3% |

Example 3

Within the Field of the Invention

An accumulator C is made as described in Example 1, but the positive electrode of which contains as a conducting material, a conducting powder of the $Li_xCoO_2$ type. This conducting material is made in the following way: in a thermally insulated stainless steel reactor and equipped with a heating resistor, with a three-blade stirrer and a gas filter, a powder of cobalt hydroxide is suspended in a 5 mol/L lithine solution which is heated to 85° C. The molar ratio $LiOH/Co(OH)_2$ is of 7 for 1. Oxygen bubbling through the gas filter is introduced into the suspension with stirring. The oxygen flow is stopped after 1 hour of reaction. A 1.5 mol/L sodium hypochlorite solution is added into the reactor at room temperature, so that the molar ratio of NaOCl over $LiCoO_2$ is 20%. After half an hour, the $Li_xCoO_2$ powder is recovered by centrifugation. The total duration for synthesizing the material is 1 hour 30 minutes. The synthesized material is then washed with water, deionized and dried. By elementary analysis, it is seen that x is equal to 0.8. The average particle size is 0.7 µm and the conductivity of the product measured under a press (1.15 metric tons/cm²) is of 1.2 S/cm. The specific surface area is 32 m²/g.

Example 4

Within the Field of the Invention

An accumulator D is made as described in Example 2, but the positive electrode of which contains nickel hydroxide, the surface of which is covered with a conducting material of the $Li_xCoO_2$ type. This nickel hydroxide was obtained in the following way: in a thermally insulated stainless steel reactor equipped with a heating resistor, with a three-blade stirrer and a gas filter, nickel hydroxide for which the surface is covered with cobalt hydroxide is suspended in a 5 mol/L lithine solution which is heated to 85° C. The molar ratio $LiOH/Co(OH)_2$ is of 7 for 1. Oxygen bubbling through the gas filter is introduced into the suspension with stirring. The oxygen flow is stopped after 1 hour of reaction. An oxygenated water solution is then added into the reactor at room temperature, so that the molar ratio $H_2O_2/LiCoO_2$ is 40%. After half an hour, the nickel hydroxide powder, the surface of which is covered with $Li_xCoO_2$ is recovered by centrifugation. The total duration for synthesizing the material is 1 hour 30 minutes. The synthesized material is then washed with deionized water and dried. By elementary analysis, it is seen that x is equal to 0.8. The conductivity of the material, measured under a press (1.15 metric tons/cm²) is 0.31 S/cm. The specific surface area is 15 m²/g.

Example 5

Within the Field of the Invention

An accumulator E is made as described in Example 1, but the positive electrode of which contains as a conducting material, a conducting powder of the $Li_xNi_{0.03}Co_{0.97}O_2$ type. This conducting material is made in the following way: in a thermally insulated stainless steel reactor equipped with a heating resistor, with a three-blade stirrer and with a gas filter, nickel and cobalt hydroxide as a powder is suspended in a 5 mol/L lithine solution which is heated to 85° C. The molar ratio $LiOH/Ni_{0.03}Co_{0.97}(OH)_2$ is 7 for 1. Oxygen bubbling through the gas filter is introduced into the suspension with stirring. The oxygen flow is stopped after 1 hour of reaction. A 1.5 mol/L sodium hypochlorite solution is then added into the reactor at room temperature, so that the molar ratio $NaOCl/Li_xNi_{0.03}Co_{0.97}O_2$ is 20%. After half an hour, the $Li_xNi_{0.03}Co_{0.97}O_2$ powder is recovered by centrifugation. The total duration for synthesizing the material is 1 hour 30 minutes. The synthesized material is then washed with deionized water and dried. By elementary analysis, it is seen that x is equal to 0.8. The average particle size is 0.65 µm and the conductivity of the product measured under a press (1.15 metric tons/cm²) is 0.8 S/cm. The specific surface area is 35 m²/g.

Example 6

Outside the Invention

An accumulator F is made in the way as described in Example 1, but the positive electrode of which contains as a conducting material, a conducting powder of the $Li_xCoO_2$ type. This conducting material is made in the following way: in a thermally insulated stainless steel reactor and equipped with a heating resistor, with a three-blade stirrer and a gas filter, cobalt hydroxide as a powder is suspended in a 0.5 mol/L lithine solution which is heated to 50° C. The concentration of the lithine solution is less than 1 mol/L, therefore insufficient. The molar ratio $LiOH/Co(OH)_2$ is 2 for 1. Air bubbling through the gas filter is introduced into the suspension with stirring. The air flow is stopped after 1 hour of reaction. A 1.5 mol/L sodium hyperchlorite solution is then added into the reactor at room temperature, so that the molar ration $NaOCl/LiCoO_2$ is 20%. After half an hour, the $Li_xCoO_2$ powder is recovered by centrifugation. The total duration for synthesizing the material is 1 hour 30 minutes. The synthesized material is then washed with deionized water and dried. By elementary analysis, it is seen that x is equal to 0.7. The average particle size is 0.7 µm and the conductivity of the product measured under a press (1.15 metric tons/cm²) is 0.003 S/cm. The specific surface area is 75 m²/g.

Example 7

Outside of the Invention

An accumulator G is made as described in Example 1, but the positive electrode of which contains as a conducting material, a conducting powder of the $Li_xCoO_2$ type. This conducting material is made in the following way: in a thermally insulated stainless steel reactor equipped with a heating resistor, with a three-blade stirrer and with a gas filter, cobalt hydroxide as a powder is suspended in a 0.7 mol/L lithine solution which is heated to 72° C. The concentration of the lithine solution is less than 1 mol/L, therefore insufficient. The molar ratio LiOH over $Co(OH)_2$ is 3 for 1. Oxygen bubbling through the gas filter is introduced into the suspension with stirring. The oxygen flow is stopped after 1 hour of reaction. A 1.5 mol/L sodium hypochlorite solution is then added into the reactor at room temperature, so that the molar ratio $NaOCl/LiCoO_2$ is 20%. After half an hour, the $Li_xCoO_2$ is recovered by centrifugation. The total duration for synthesizing the material is 1 hour 30 minutes. The synthesized material is then washed with deionized water and dried. By elementary analysis, it is seen that x is equal to 0.8. The average particle size is 0.6 µm and the conductivity of the product measured under a press (1.15 metric tons/cm²) is 0.8 S/cm. The specific surface area is 62 m²/g.

Example 8

Outside the Invention

An accumulator H is made as described above but the positive electrode of which contains as a conducting material, a conducting powder of the $Li_xCoO_2$ type. This conducting material is made according to the embodiment of document EP-A-1 022 793. A powder of nickel hydroxide containing 50% of cobalt hydroxide is prepared according to the following method: in a precipitation reactor maintained at a constant temperature of 50° C., 0.5 L of a mixture of a 0.5 mol/L cobalt sulphate and 0.5 mol/L nickel sulphate solution is introduced. The synthesis is accomplished under an inert atmosphere with the purpose of avoiding any contact with oxygen, in order to overcome the risks of oxidation of the cobalt hydroxide to be produced. 650 g of a caustic soda solution with a concentration of 2 mol/L are added thereto according to a constant and continuous flow for 30 minutes. When the addition of soda is finished, the solution is maintained with stirring and constant heating for 2 hours in order to achieve ripening of the hydroxide particles. The obtained precipitate is then filtered and washed at room temperature with distilled water under an inert atmosphere. The obtained product is then dried in vacuo for 24 hours at a temperature of 70° C., after sweeping the oven with an inert gas. The obtained precipitate is then milled under an inert atmosphere to the adequate grain size. A mixed hydroxide is obtained of formula $Ni_{0.5}Co_{0.5}(OH)_2$. This mixed hydroxide is suspended in a solution containing excess sodium hypochlorite solution at 48° C. for 2 hours at 20° C. The product is washed with deionized water and dried at 70° C. The obtained compound is a mixed oxyhydroxide of formula $Ni_{0.5}Co_{0.5}OOH$. This mixed oxyhydroxide is then suspended in a 5 mol/L LiOH solution at 90° C. for 72 hours. The product is washed with deionized water and dried at 70° C. The obtained product is a lithiated nickel and cobalt oxide of formula $Li_xNi_{0.5}Co_{0.5}O_2$. By elementary analysis, it is seen that x is equal to 1. The average size of the particles is 0.3 μm and the conductivity of the product measured under a press (1.15 metric tons/cm$^2$) is 0.8 S/cm. The specific surface area is 78 m$^2$/g.

Electric Test:

After an initial rest of 48 hours and charging for 20 hours with a current of 0.05 Ic, followed by a discharge at 0.2 Ic, the accumulators A-H are tested electrochemically. Ic designates the current required for discharging the rated capacity C of the accumulator within 1 hr. An evaluation of the irreversible loss of storage capacity in the completely discharged condition of the accumulator is carried out under the following conditions:

Cycle 1: Charging at 0.1 Ic for 16 hours at 20° C., discharging at 0.2 Ic down to a cut-off voltage of 1 Volt.

Cycles 2 to 5: Charging at Ic for 1.2 hours at 20° C., discharging at Ic down to a cut-off voltage of 1 Volt.

The accumulators A to H are stored in the discharged condition at 40° C. connected onto a resistor of 1 Ohm for 3 days. After storage, a measurement of the remaining capacity is carried out under the following conditions:

Cycles 6 to 10: Charging at Ic for 1.2 hours at 20° C., discharging at Ic down to 1 Volt.

The loss of capacity due to the storage on a resistor is determined by relating the measured capacity at the tenth cycle to the one obtained at the fourth cycle. The accumulators are then cycled until the discharge capacity at Ic down to a cut-off voltage of 1 Volt becomes less than 80% of the measured capacity at cycle 4.

The obtained results are grouped in the following table.

| Generator | A | B | C | D | E | F | G | H |
|---|---|---|---|---|---|---|---|---|
| Yield at cycle 1 (mAh/g) | 251 | 254 | 249 | 251 | 247 | 224 | 251 | 245 |
| Yield at cycle 4 (mAh/g) | 239 | 248 | 240 | 242 | 237 | 140 | 242 | 236 |
| Yield at cycle 10 (mAh/g) | 189 | 218 | 238 | 241 | 235 | 139 | 239 | 235 |
| Loss of capacity during storage (%) | 21 | 12 | 1 | 1 | 1 | 1 | 1 | 1 |
| Lifetime (number of cycles) | 489 | 495 | 482 | 498 | 485 | 332 | 242 | 315 |

The capacity loss of the accumulators C, D, and E during this storage is only 1%, which is very small as compared with the 21% and 12% capacity losses obtained with accumulators A and B respectively, the lifetime of the accumulators C, D and E is comparable with that of the accumulators A and B. It is understood from these results that by using a material of the $Li_xNi_yCo_{1-y}O_2$ type as a conducting material of the non-sintered positive electrode (accumulators C, D, and E), synthesized according to the method of the invention, satisfactory electrochemical performances may be retained, even after prolonged storage at a low potential, as well as excellent performances as regards lifetime.

The accumulator F using a nickel and cobalt oxide outside the field of the invention, has a poor lifetime.

The accumulator G using a nickel and cobalt oxide outside the field of the invention because of its specific surface area, leads to good initial electrochemical performances and during prolonged storage at a low potential, but to an extremely reduced lifetime.

Also, the accumulator H using a nickel and cobalt oxide made according to the method of the document EP-A-1 022 793 and which has a specific surface area outside the field of the invention, leads to good initial electrochemical performances and during prolonged storage at a low potential, but to a clearly reduced lifetime.

The invention claimed is:

1. A positive electrode of an accumulator with an alkaline electrolyte comprising a nickel-based hydroxide and a lithiated oxide of formula $Li_xMO_2$ wherein
    M represents at least one transition metal, $0.1 \leq x \leq 1$,
    said lithiated oxide having a specific surface area as measured by the BET technique of less than 40 m$^2$/g and a grain size of less than 1 um.

2. The electrode according to claim 1, comprising a mixture of a powder of the nickel-based hydroxide and a powder of the lithiated oxide of formula $Li_xMO_2$.

3. The electrode according to claim 1, wherein the nickel-based hydroxide is in the form of powder, the grains of which are covered with the lithiated oxide of formula $Li_xMO_2$.

4. The electrode according to claim 1, wherein the lithiated oxide $Li_xMO_2$ has the formula $Li_xNi_yCo_{1-y}O_2$ wherein
$0.1 \leq x \leq 1$,
$0 \leq y \leq 0.9$.

5. The electrode according to claim 1, wherein x is greater than or equal to 0.5, preferably greater than or equal to 0.8.

6. The electrode according to claim 1, wherein y is less than 0.2, preferably less than 0.1, still preferably less than 0.05.

7. The electrode according to claim 1, wherein the specific surface area is less than or equal to 30 $m^2/g$, preferably less than or equal to 20 $m^2/g$, preferably less than or equal to 15 $m^2/g$, preferably less than or equal to 10 m2/g.

8. The electrode according to claim 1, wherein the BET surface area is greater than 5 m2/g.

9. The electrode according to claim 1, wherein the grain size is less than 0.9 um.

10. An accumulator comprising an electrode according to claim 1.

* * * * *